United States Patent [19]

Atkinson et al.

[11] 4,337,863
[45] Jul. 6, 1982

[54] PROCESS FOR THE CONCENTRATION OF FIBROUS MATERIAL

[75] Inventors: Alan W. Atkinson; Adrian M. Steer, both of Rochdale, England

[73] Assignee: T and N Materials Research Limited, Manchester, England

[21] Appl. No.: 229,851

[22] Filed: Jan. 30, 1981

[30] Foreign Application Priority Data

Jan. 31, 1980 [GB] United Kingdom ................. 8003243

[51] Int. Cl.³ .............................................. B03B 9/00
[52] U.S. Cl. ..................................... 209/12; 209/211; 209/159
[58] Field of Search ................... 241/20, 24; 209/3, 9, 209/12, 158–161, 164, 165, 170, 210, 211

[56] References Cited

U.S. PATENT DOCUMENTS

| | | | |
|---|---|---|---|
| 2,783,884 | 3/1957 | Schaub | 209/165 |
| 3,295,677 | 1/1967 | Condolios | 209/158 X |
| 3,865,315 | 2/1975 | Roberts et al. | 209/3 |
| 4,039,425 | 8/1977 | Neauel | 209/158 X |
| 4,251,320 | 2/1981 | Cederquist et al. | 209/3 |

Primary Examiner—Ralph J. Hill

Attorney, Agent, or Firm—Cushman, Darby & Cushman

[57] ABSTRACT

Process for the concentration of fibrous material in a mixture thereof with non-fibrous material, by subjecting an aqueous suspension of the mixture to centrifugal force in a hydrocylone to obtain an overflow enriched in fibre and an underflow of reduced fibre content, the aqueous suspension which is admitted to the hydrocylone being the fibre-enriched fraction which results from a preliminary classification in which an aqueous suspension of lower fibre:non-fibre ratio is submitted to flow under conditions which bring about settling out under ordinary gravitational force of material reduced in fibre content and formation of a fibre-enriched fraction above it.

In the process, the underflow flow from the hydrocylone is incorporated in the aqueous suspension which is submitted to the preliminary classification.

The process, which keeps to a minimum the amount of valuable fibre lost, is specially applicable to the concentration of fibres in the fibrous products (mineral wool) formed by disintegrating silicate and like mineral melts, which commonly contain relatively high proportion of granular material ('shot').

6 Claims, 1 Drawing Figure

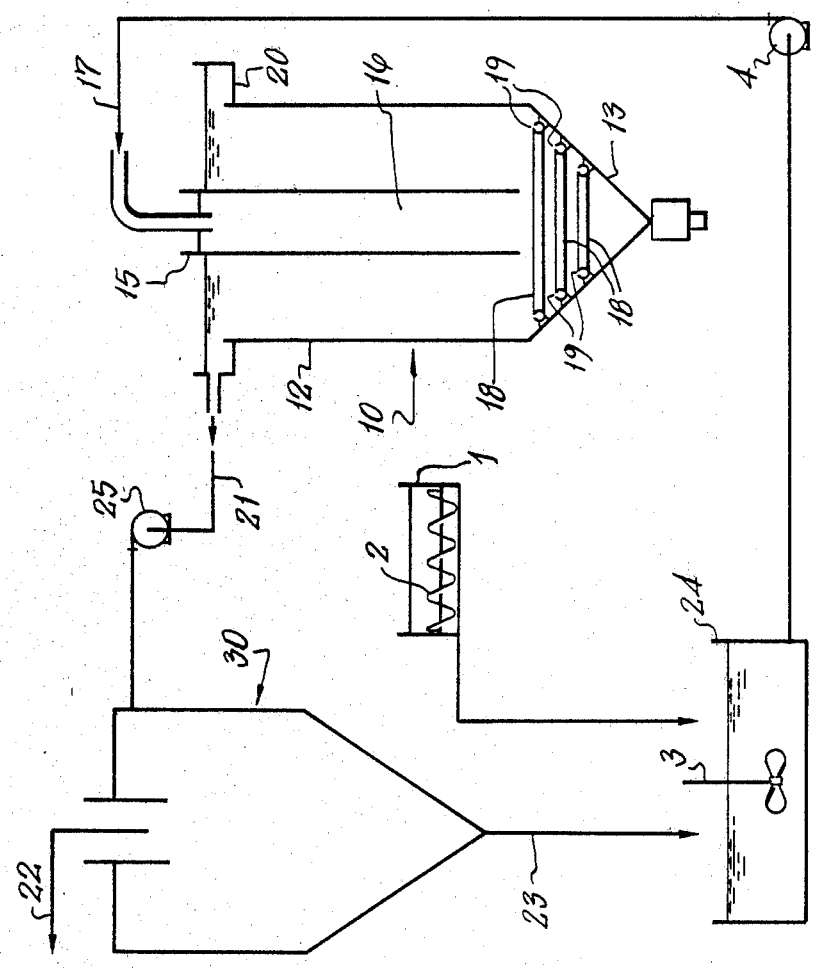

PROCESS FOR THE CONCENTRATION OF FIBROUS MATERIAL

This invention relates to the concentration of fibrous material in a mixture thereof with non-fibrous material.

Such a mixture is for example formed when a stream of silicate or like mineral melt is disintegrated to form fibres. Not all the melt becomes converted to fibres, and that which does not is present in the product (known as mineral wool) predominantly in the form of granules known as 'shot'. As much as 40% by weight or even more of the product may be constituted by shot; and because shot is abrasive, renders the product unpleasant to handle, and deleteriously affects certain important properties (for example, the capacity of the product to reinforce matrices and to reduce transmission of heat), the product is often treated to reduce its content of shot and thus to increase its concentration of fibre. However, because the density of mineral fibre is substantially the same as that of the associated non-fibrous material, separation of the two forms is a matter of considerable difficulty.

One process of concentrating fibrous material in mineral wool is described in U.K. Pat. No. 1,537,117; and in this process an aqueous dispersion (suspension) of the wool is subjected to very high centrifugal force (amounting to at least several tens G) in a hydrocyclone to obtain an overflow enriched in fibre and an underflow of reduced fibre content. The aqueous suspension which is admitted to the hydrocyclone is the fibre-enriched fraction which results from a preliminary classification, in which an aqueous suspension of lower fibre: non-fibre ratio, and preferably of solids content not greater than 4% by weight, is submitted to high speed rotary agitation to bring about settling out under ordinary gravitational force of material reduced in fibre content and formation of a fibre-enriched fraction above it.

As for the overflow and underflow from the hydrocyclone in the prior art procedure; the underflow is dewatered, drum-dried and used as feed for the furnace supplying the melt from which the original fibrous material is obtained by disintegration; and the overflow is dewatered, preferably with use of a centrifuge, to a solids content in the range 30–70% by weight, in which form it is marketed for direct use in those manufacturing procedures which involve redispersion, shaping, dewatering and drying steps.

We have found that the hydrocyclone underflow produced at an acceptable throughput of suspension in the kind of procedure just described contains, in addition to the non-fibrous material (shot) which it is desired to remove, a significant proportion of valuable fibre; and according to our invention, we avoid the waste of this fibre which is entailed in feeding the dried hydrocyclone underflow back to the melt-producing furnace, by incorporating the underflow in the aqueous suspension which is submitted to the preliminary classification earlier referred to; that is, to flow under conditions which bring about settling out under ordinary gravitational force of material reduced in fibre content and formation of a fibre-enriched fraction above it.

In the preliminary classification however, we much prefer to avoid the kind of motion of the suspension which results from high speed rotary agitation, and instead to cause substantially non-turbulent upward flow of the suspension as described in our patent application JKA/1 filed with this present application. High speed rotary agitation induces shot suspended in the continuous aqueous phase of the suspension to move in a direction counter to that desired i.e. up instead of down, with consequent loss of efficiency in the separation of fibrous from non-fibrous material.

Preferably, the fibre-enriched fraction which is admitted to the hydrocyclone has a fibre: non-fibre weight ratio in the range 5:1–25:1; and the solids content of the fibre-enriched fraction is preferably in the range 0.25–2.5% by weight.

Preferably, upward non-turbulent flow of the aqueous suspension during preliminary classification is produced by allowing the suspension to flow under gravity down a channel at the lower end of which it is diverted so as to flow upwardly around said channel.

Preferably the rate of upward non-turbulent flow of said aqueous suspension is in the range 0.1–2 cm per second.

According to a further preferred feature, gas bubbles are passed upwardly through the aqueous suspension during its upward non-turbulent flow. These bubbles impart only highly localised agitation, and this assists disengagement of granular from fibrous material.

The invention will now be further described with reference to the accompanying drawing, which is a diagram of plant which can be employed in putting the invention into practice.

The plant includes a vessel 10, in which preliminary classification is carried out, and a hydrocyclone 30 of an entirely conventional type fed from the vessel 10 (e.g. a 6-inch (152 mm) diameter ALFA-LAVAL model CELLECO 206).

The vessel 10 (suitably of diameter 1.2 m) has a vertical cylindrical wall 12 (height 1.8 m) and a conical bottom 13 (height 1.2 m) from whose extremity shot separated in the preliminary classification can be collected at intervals. Disposed axially within the vessel is a pipe 15 forming a channel 16 for the delivery to the lower part of the vessel of aqueous suspension admitted (as indicated by the arrow) by line 17.

Within the conical bottom 13 of vessel 10 are a number of toroidal tubes 18 by which air or other suitable gas inert to the suspension such as nitrogen can be passed, via holes 19 about 0.5 mm diameter in the tubes, to bubble up through the aqueous suspension which flows upwardly around the channel 16 once the conical bottom 13 of the vessel has been filled.

Surrounding the upper rim of vessel 10 is a coaxial trough 20 into which aqueous suspension enriched in fibre following its upward non-turbulent flow in the vessel overflows and from which it is passed via line 21 and pump 25 to hydrocyclone 30. The overflow from the hydrocyclone is indicated by 22.

The underflow 23 from the hydrocyclone is incorporated in the aqueous suspension delivered to vessel 10 for preliminary classification, as will appear later.

In concentrating the fibre in a typical commercially available mineral wool formed from a silicate melt and containing about 45% by weight of shot, the following procedure can be adopted.

An unopened bale of the wool is crushed in a press (pressure about 1 MPa) to shorten the average fibre length to a value in the range 1–10 mm.

The bale is then broken up without any substantial further reduction in fibre length, and the resulting material is made into a mobile slurry of solids content 10% by weight by adding it with vigorous stirring to an aqueous solution containing 0.1% by weight of surface-active agent. Conveniently, the surfactant is a cationic long-chain alkyl substituted imidazoline such as that which has been used for many years to coat glass fibres to improve their dispersibility in aqueous media during manufacturing processes e.g. when making them up into glass fibre tissue. The mobile slurry is prepared in a vat 1 equipped with a ribbon mixer 2 to break down the bulk of any residual fibre of length greater than 10 mm.

The slurry is transferred from the vat 1 to a tank 24 in which, with continuous stirring by stirrer 3, it is diluted to form an aqueous suspension of solids content 1% by weight and of fibre:non-fibre ratio about 1.25:1. This suspension is pumped via pump 4 and line 17 into the upper part of pipe 15 in vessel 10 and allowed to flow under gravity down channel 16 into the conical bottom 13 of the vessel. Having filled the conical bottom of the vessel 10 the aqueous suspension flows upwardly around the channel 16, the rate of feed via line 17 being adjusted so as to produce a rate of upward non-turbulent flow of about 5 mm per second. During this upward flow there are passed upwardly through the suspension air bubbles which issue from the holes 19 in tubes 18. This reduces the tendency for the rising fibres to form persistent clumps as they become progressively disengaged from shot during their upward passage in the vessel.

Shot sinking under gravity to the bottom of vessel 10 can be run off periodically. It is substantially free from fibre and has a preponderance of coarse particles such as would damage a hydrocyclone and associated pump operating at ordinary flow rates.

The overflow 22 from hydrocyclone 30 is dewatered in the conventional manner e.g. by centrifuge, to about 50% water content. If desired, it can be dried to a moisture content less than 5% by weight.

The underflow 23 from the hydrocyclone is mixed in tank 24 with fresh aqueous suspension issuing from vat 1, and the mixture incorporating the underflow is submitted to treatment in vessel 10.

In a typical run with hydrocyclone 30 operating at a flow rate of about 5 liters per second and a pressure drop of 15 psi (100 kPa), the overflow contained 1% by weight of non-fibrous material; shot recovered from the bottom of vessel 10 contained no significant proportion of fibre. Samples of the underflow 23 taken at intervals had a fibre:non-fibre ratio of 0.5:1–2:1.

We claim:

1. In a process for the concentration of fibrous material obtained from mineral melt in a mixture thereof with non-fibrous mineral melt material, comprising subjecting an aqueous suspension of the mixture to centrifugal force in a hydrocyclone to obtain an overflow enriched in fiber and an underflow of reduced fiber content, the aqueous suspension which is admitted to the hydrocyclone being the fiber-enriched fraction which results from a preliminary classification;

said preliminary classification comprising submitting an aqueous suspension of lower fiber:non-fiber ratio to flow under conditions which bring about settling out under ordinary gravitational force of material reduced in fiber content and formation of a fiber-enriced fraction above it;

the improvement consisting of incorporating the underflow from the hydrocyclone in the aqueous suspension which is submitted to said preliminary classification.

2. A process according to claim 1, in which preliminary classification of said aqueous suspension is carried out with substantially non-turbulent upward flow thereof.

3. Process according to claim 2, in which said substantially non-turbulent upward flow of the aqueous suspension is produced by allowing said suspension to flow under gravity down a channel at the lower end of which it is diverted so as to flow upwardly around said channel.

4. Process according to claim 1, 2 or 3, in which the solids content of said aqueous suspension submitted to preliminary classification is in the range 0.25–2.5% by weight.

5. Process according to claim 1, 2 or 3, in which said aqueous suspension submitted to preliminary classification is stirred during its upward flow by the passage of gas bubbles upwardly through it.

6. Process according to claim 1, 2 or 3, in which during preliminary classification the upward flow of said aqueous suspension is at a rate in the range 0.1–2 cm per second.